(12) United States Patent
Yo

(10) Patent No.: US 9,470,864 B1
(45) Date of Patent: Oct. 18, 2016

(54) PHOTOELECTRIC CONVERSION MODULE

(71) Applicant: AQUAOPTICS CORP., Tainan (TW)

(72) Inventor: Shih-Jye Yo, Zhubei (TW)

(73) Assignee: AQUAOPTICS CORP., Tainan (TW)

( * ) Notice: Subject to any disclaimer, the term of this patent is extended or adjusted under 35 U.S.C. 154(b) by 0 days.

(21) Appl. No.: 14/842,350

(22) Filed: Sep. 1, 2015

(51) Int. Cl.
*G02B 6/42* (2006.01)

(52) U.S. Cl.
CPC ............. *G02B 6/4284* (2013.01); *G02B 6/426* (2013.01); *G02B 6/428* (2013.01); *G02B 6/4214* (2013.01); *G02B 6/4281* (2013.01)

(58) Field of Classification Search
CPC ..................................................... G02B 6/4281
See application file for complete search history.

(56) References Cited

U.S. PATENT DOCUMENTS

| | | | | |
|---|---|---|---|---|
| 2012/0076454 A1* | 3/2012 | Shiraishi | ................. | G02B 6/42 385/14 |
| 2012/0224814 A1* | 9/2012 | Hirano | ..................... | H04N 7/22 385/49 |
| 2013/0037209 A1* | 2/2013 | Ohhashi | ............... | G02B 6/4239 156/275.7 |
| 2013/0182390 A1* | 7/2013 | Teo | ....................... | G02B 6/4266 361/707 |
| 2013/0315528 A1* | 11/2013 | Levy | ...................... | G02B 6/425 385/14 |
| 2014/0270811 A1* | 9/2014 | Park | .................... | H04B 10/2504 398/212 |
| 2014/0294351 A1* | 10/2014 | Huang | ................. | G02B 6/4281 385/89 |
| 2015/0309269 A1* | 10/2015 | Daikuhara | ........... | G02B 6/4281 385/14 |

* cited by examiner

*Primary Examiner* — Jerry Rahll
(74) *Attorney, Agent, or Firm* — Muncy, Geissler, Olds & Lowe P.C.

(57) ABSTRACT

A photoelectric conversion module includes a circuit board, a flexible substrate configured on the circuit board, with a concave structure having a first optical micro-reflection surface and a second optical micro-reflection surface formed opposite to the first optical micro-reflection surface, an optical component configured on the flexible substrate, an IC chip mounted on the circuit board and electrically connected to the optical component via a wire and a conductive trace on the flexible substrate, and an optical waveguide member connected to the flexible substrate. The flexible substrate and the optical waveguide member are packaged by a carrier or an optical connector.

20 Claims, 8 Drawing Sheets

PHOTOELECTRIC CONVERSION MODULE

TECHNICAL FIELD

The present invention relates to a photoelectric device, and more particularly, to a photoelectric conversion module to provide signal transmission between the optical layer and electrical layer.

BACKGROUND

Light beams or optical signals are frequently used to transmit digital data between electronic devices, both over long distances and between adjacent circuit boards. A light beam may be modulated as needed to carry data. An optical signal may also be used for other purposes including position or motion sensing, measurement, etc.

Consequently, optical technology plays a significant role in modern electronics, and many electronic devices employ optical components. Examples of such optical components include optical or light sources such as light emitting diodes and lasers, waveguides, fiber optics, lenses and other optics, photo-detectors and other optical sensors, optically-sensitive semiconductors, and others.

SUMMARY OF THE INVENTION

In this invention, a photoelectric conversion module is proposed. The photoelectric conversion module comprises two parts, optical layer and electrical layer. The photoelectric conversion module comprises includes a circuit board, a flexible substrate configured on the circuit board, with a concave structure having a first optical micro-reflection surface and a second optical micro-reflection surface formed opposite to the first optical micro-reflection surface, an optical component configured on the flexible substrate, an IC chip mounted on the circuit board and electrically connected to the optical component via a wire and a conductive trace on the flexible substrate, and an optical waveguide member connected to the flexible substrate. The flexible substrate and the optical waveguide member are packaged (enclosed) by a carrier or an optical connector. The optical waveguide member is an external optical waveguide component, for example an optical fiber, or an optical waveguide.

According to one aspect, a photoelectric conversion module comprises a circuit board, a flexible substrate configured on the circuit board, with a concave structure having a first optical micro-reflection surface and a second optical micro-reflection surface formed opposite to the first optical micro-reflection surface, an optical component configured on the flexible substrate, an IC chip mounted on the flexible substrate and electrically connected to the optical component via a conductive trace on the flexible substrate, and an optical waveguide member connected to the flexible substrate.

According to another aspect, a photoelectric conversion module comprises a circuit board with plural cavities or holes, an optical component configured on one of the plural cavities or holes, an IC chip configured on another of the plural cavities or holes, and a flexible substrate configured on the circuit board, with a concave structure having a first optical micro-reflection surface and a second optical micro-reflection surface formed opposite to the first optical micro-reflection surface, wherein the IC chip is electrically connected to the optical component via a conductive trace on the flexible substrate, an optical waveguide member connected to the flexible substrate. The flexible substrate and the optical waveguide member are packaged (enclosed) by a carrier or an optical connector.

According to yet another aspect, the flexible substrate is FPC board, and the flexible substrate is composed of a clad and a core, wherein the concave structure is V-shape trench, wherein vertical thickness of the V-shape trench is larger than that of the core, and the V-shape trench is passing through the core. The circuit board includes plural electrode terminals arranged at an end portion of the circuit board.

The photoelectric conversion module further comprises a housing composed of a first case and a second case, wherein the circuit board is fixed to the second case, and a plug configured at one end of the housing.

BRIEF DESCRIPTION OF THE DRAWINGS

The components, characteristics and advantages of the present invention may be understood by the detailed descriptions of the preferred embodiments outlined in the specification and the drawings attached.

DETAILED DESCRIPTION

Some preferred embodiments of the present invention will now be described in greater detail. However, it should be recognized that the preferred embodiments of the present invention are provided for illustration rather than limiting the present invention. In addition, the present invention can be practiced in a wide range of other embodiments besides those explicitly described, and the scope of the present invention is not expressly limited except as specified in the accompanying claims.

Figure 1:
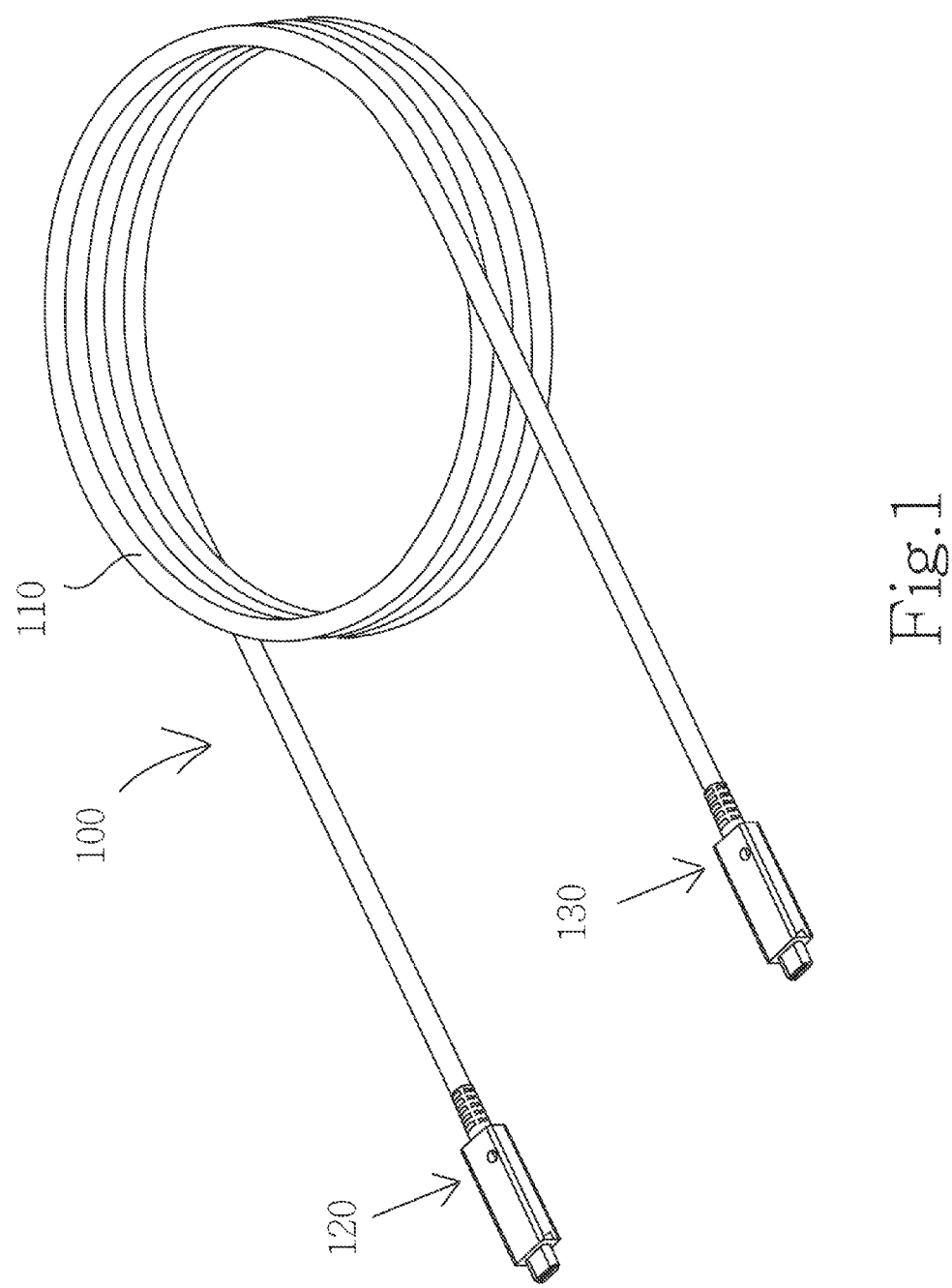
FIG. 1 illustrates a schematic structural perspective view showing an active optical cable provided with photoelectric conversion module according to an embodiment of the invention.

FIG. 1 illustrates a schematic perspective view showing an outer appearance of an active optical cable (AOC) 100. The active optical cable 100 is composed of a photoelectric composite cable 110, and a first photoelectric conversion component/module 120 and a second photoelectric conversion component/module 130 which are attached to both ends of the photoelectric composite cable 110. The active optical cable 100 may be used for unidirectional transmission or bidirectional transmission. The active optical cable 100 may be applied to be as a high speed transmission wire, such as USB, HDMI, Lighting or Thunderbolt interface, for cable line consumer products, or applied to be as a transmission wire, such as storage BUS including Fiber Channel (FC), SAS, PCIe or SATA, for photoelectric products or equipment. In an example, active optical cable 100 may be used for connection between digital audio-video (AV) apparatus or equipment. In one embodiment, the first photoelectric conversion module 120 is an optical transmitter and the second photoelectric conversion module 130 is an optical receiver, for unidirectional transmission. In another embodiment, the first photoelectric conversion module 120 is a first optical transceiver and the second photoelectric conversion module 130 is a second optical transceiver, for bidirectional transmission. For example, the photoelectric composite cable 110 may be using an optical fiber cable or a hybrid cable depending on various applications. The hybrid cable is composed of optical fiber and electrical wire.

Figure 2:
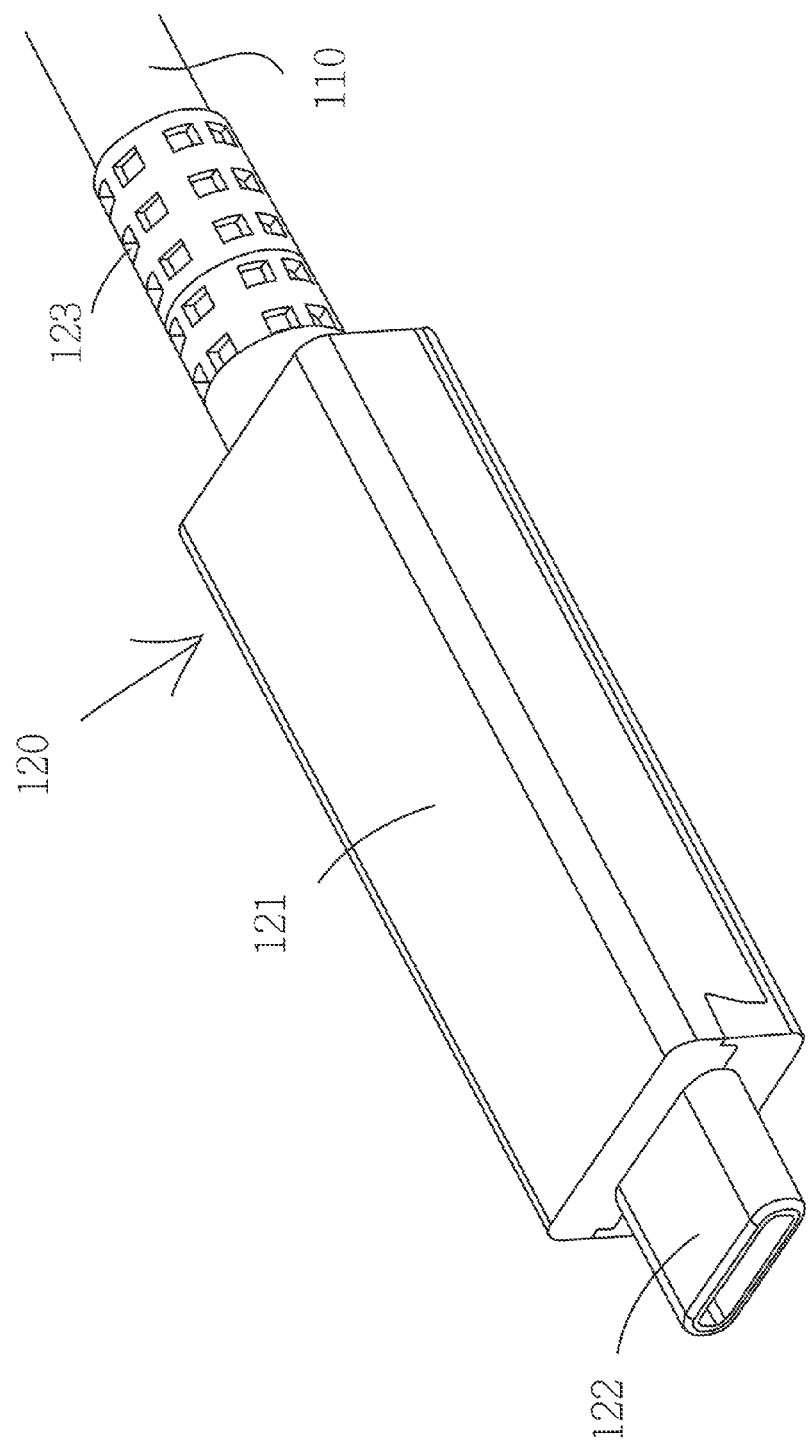
FIG. 2 illustrates an enlarged perspective view showing the photoelectric conversion module with a portion of the photoelectric composite cable according to an embodiment of the invention.

FIG. 2 illustrates an enlarged perspective view showing the photoelectric conversion module 120 with a portion of the photoelectric composite cable 110. The photoelectric conversion module 120 has a housing 121 made of, e.g., metal which has, e.g., a box shape. The photoelectric composite cable 110 is extended out from one end of the housing 121 via a sealing member while a plug 122 is configured/fixed at another end of the housing 121. The photoelectric composite cable 110 is covering by a boot 123 adjacent another end of the housing 121.

Figure 3:
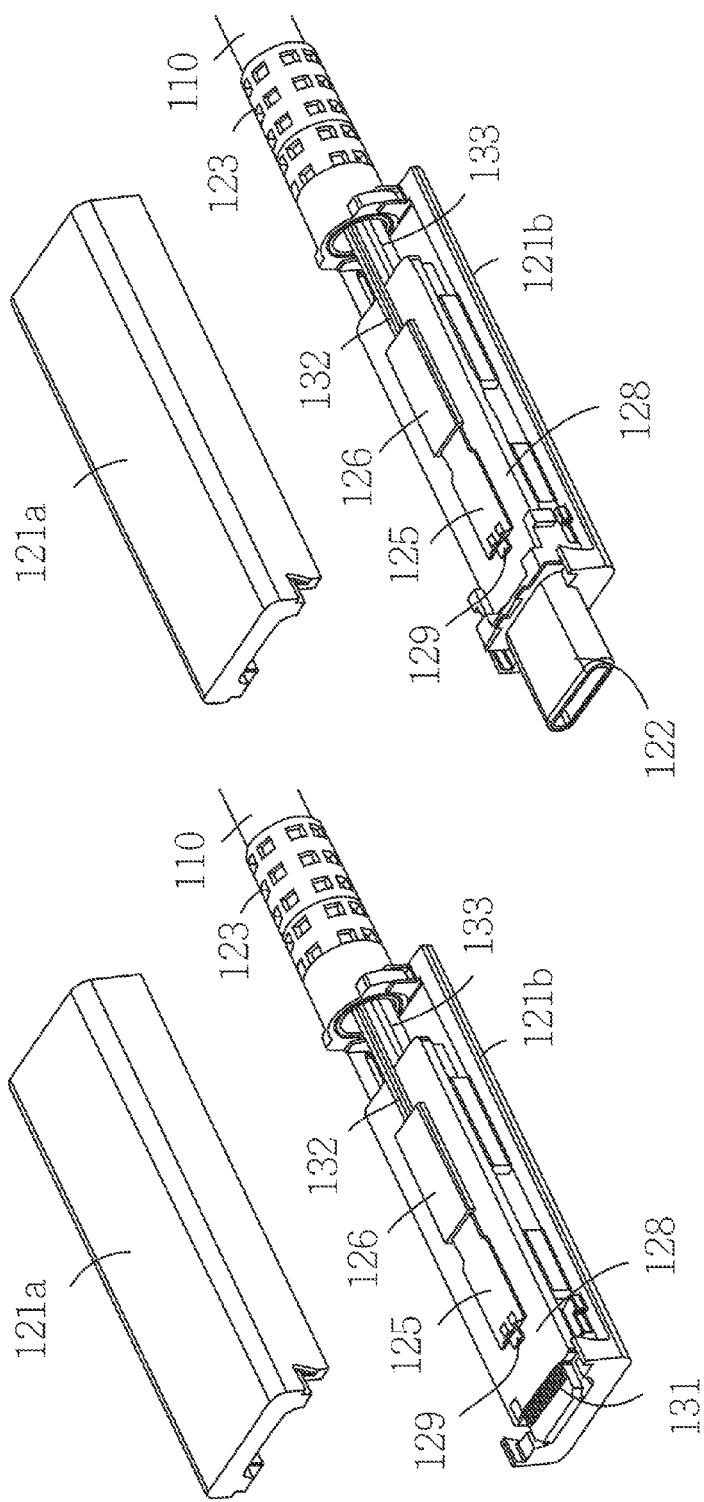
FIG. 3A is a schematic exploded perspective view showing the photoelectric conversion module according to an embodiment of the invention.
FIG. 3B is a schematic exploded perspective view showing the photoelectric conversion module according to a further embodiment of the invention.

FIG. 3A is a schematic exploded perspective view showing the photoelectric conversion module 120. The photoelectric conversion module 120 is a flexible photoelectric conversion module with a flexible printed circuit (FPC) board 125 as substrate. The housing 121 is composed of, e.g., a first case 121a and a second case 121b which are separable from each other. The first case 121a is top case and a second case 121b is bottom case. Flexible waveguide and reflector/mirror are integrated with the FPC board 125 to form an electric-optical hybrid flexible substrate. The flexible printed circuit (FPC) board 125 is configured/attached on a circuit board 128. The circuit board 128 is fixed to the second case 121b. All components of the photoelectric conversion module 120 are embedded in the interior of the housing 121. A predetermined conductor pattern is formed on the circuit board 128. The conductor pattern includes plural electrode terminals 131 made of, e.g., metal such as copper which are arranged at an end portion of the circuit board 128. The electrode terminals 131 are electrically connected to electrode terminals provided on an electronic apparatus or equipment, such as digital AV apparatus or equipment. Large-scale integrated circuits (LSI) 129 with plural ICs are configured/attached to the circuit board 128. In this embodiment, the photoelectric composite cable 110 is hybrid cable composed of plural optical fibers 132 and plural electrical wires 133 which extend into the housing 121 through the boot 123 and sealing member. The photoelectric composite cable 110 is fixed on one side of the second case 121b by the boot 123. The plural optical fibers 132 and plural electrical wires 133 are packaged/attached on the circuit board 128. The sealing member locates between the photoelectric conversion module 120 and the photoelectric composite cable 110 for connecting with each other. The FPC board 125 with the optical waveguide member is butted on the plural optical fibers 132 by a carrier or optical connector 126 and fixed on the circuit board 128. The front end portions of the electrical wires 133 located inside the housing 16 are attached/soldered to the circuit board 128. The plural electrical wires 133 are electrically connected to the LSI 129 via the conductor pattern and the LSI 129 is electrically connected to the electrode terminals 131.

The photoelectric composite cable 110 includes plural optical fibers 132 which also extend into the housing 121 through the boot 123 and the sealing member. Then, the front ends of the plural optical fibers 132 located inside the housing 121 are fixed to an end of a photoelectric conversion module 110. Another end of the photoelectric conversion module 120 is connected to the electrode terminals 131. The photoelectric conversion module 120 has a function of converting an electrical signal received from the external electrical apparatus or equipment into an optical signal to be sent to the plural optical fibers 132. In another example, the photoelectric conversion module 120 has a function of converting an optical signal received from the plural optical fibers 132 into an electrical signal to be sent to the external electrical apparatus or equipment.

The plural electrical wires 133 are electrically connected to the LSI 129 by soldering or by a connector. The overall active optical cable (AOC) 100 is electrically connected to the external apparatus or equipment for signal connection via a plug 122 of FIG. 3B, or via the electrode terminals 131 on the circuit board 128 of FIG. 3A.

Figure 4:
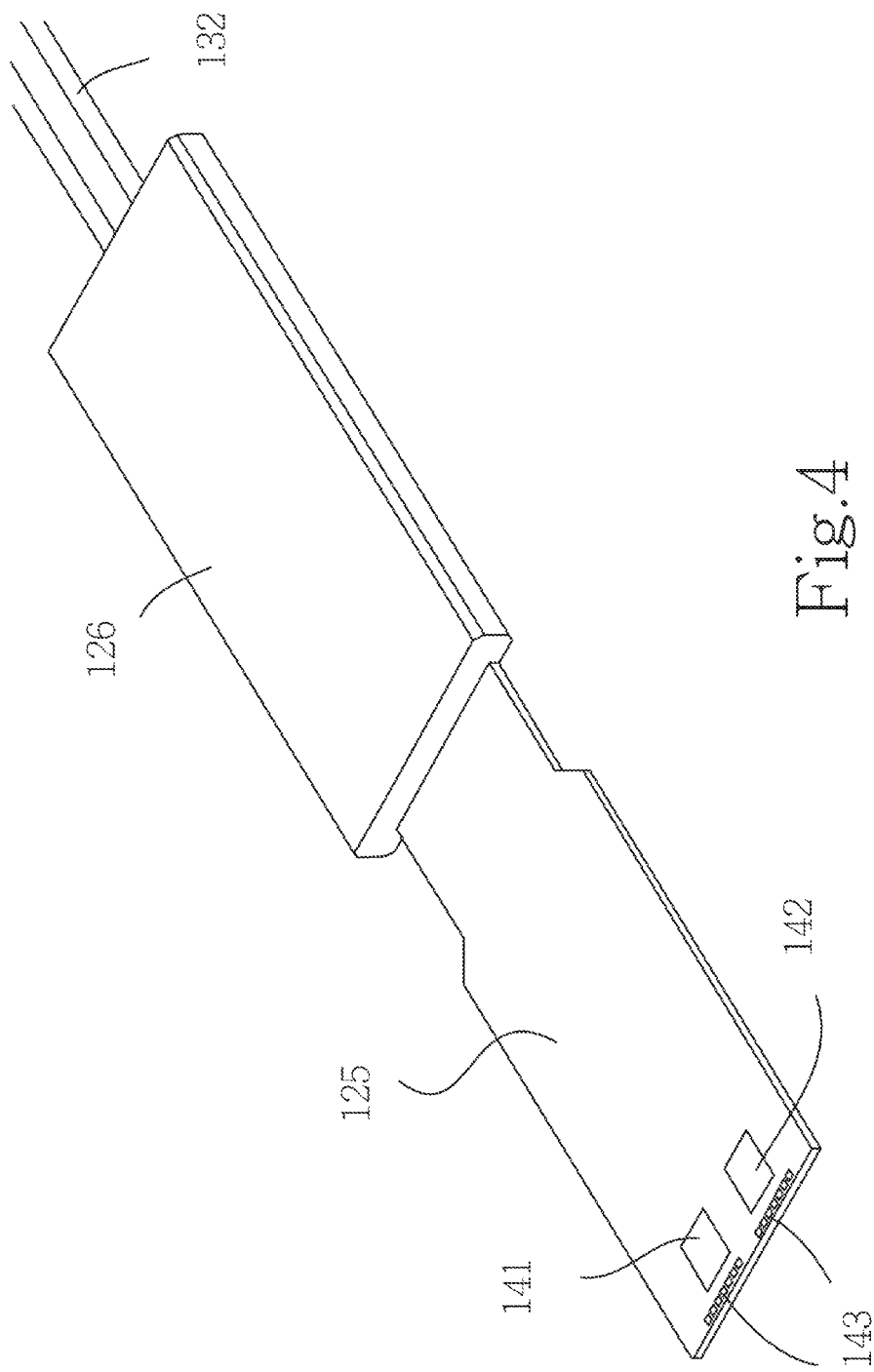
FIG. 4 illustrates a perspective view showing the photoelectric conversion module on the first case side according to one embodiment of the invention.

FIG. 4 is a perspective view showing the photoelectric conversion module 120 on the first case 121a side. The photoelectric conversion module 120 includes a FPC board 125 which is composed of, e.g., a flexible and translucent film made of, e.g., polyimide, and a conductor pattern made of, e.g., metal such as copper, gold or nickel, provided on the film. Alternatively, translucency may be obtained by forming holes on the FPC board 125. The FPC board 125 with the optical waveguide member is butted on the plural optical fibers 132 by a carrier or optical connector 126. Light source chip 142 and photo diode chip (PD chip) 141 are packaged on the FPC board 125. Terminals of metal trace 143 are formed on the FPC board 125 for signal connection with the light source chip 142, the photo diode chip (PD chip) 141 or ICs by wire bond or flip board mounting.

Figure 5:
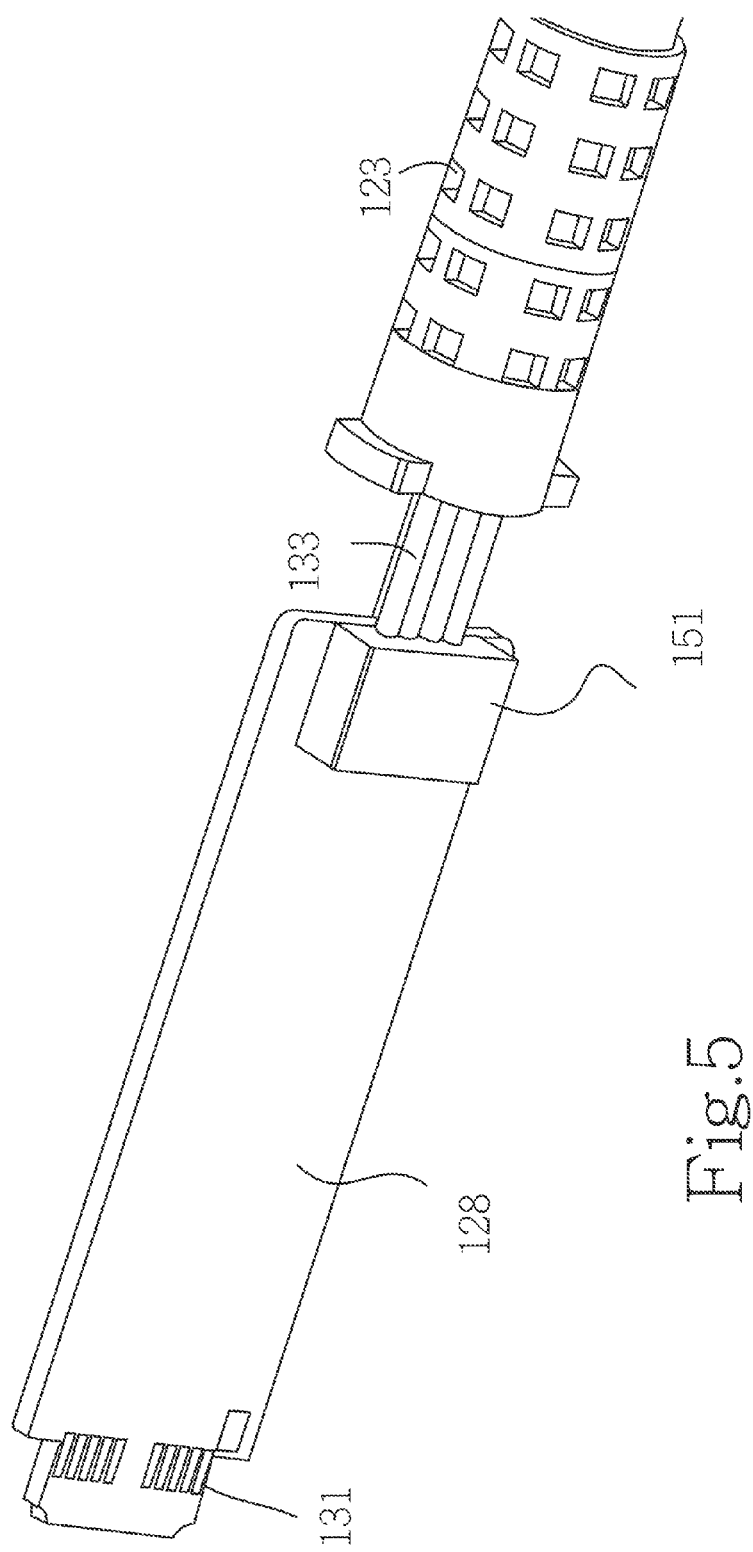
FIG. 5 illustrates a perspective view showing the photoelectric conversion module on the second case side according to one embodiment of the invention.

FIG. 5 is a perspective view showing the photoelectric conversion module 120 on the second case 112b side. The circuit board 128 includes plural electrode terminals 131 formed at an end portion of the circuit board 128, and the electrode terminals 131 are connected to the connector (not shown) on the circuit board 128. The electrode terminals 131 pattern can be made by, e.g., etching a metal film formed on the circuit board 128. The photoelectric composite cable 110 is an optical fiber cable or a hybrid cable depending on various applications. The hybrid cable is composed of optical fiber and electrical wire. In hybrid cable, the plural electrical wires 133 are electrically connected to the corresponding circuits on the circuit board by soldering or by an electrical connector 151. That is, the plural electrical wires 133 of the hybrid cable are electrically connected to the corresponding circuits on the circuit board via the electrical connector 151.

In the photoelectric conversion module 120 of the optical transmitter, the photoelectric conversion array element is a light-emitting element such as LD (laser diode) and the IC chip constitutes a driver circuit for the light-emitting element. In the photoelectric conversion module 120 of the optical receiver, the photoelectric conversion array element is a light-receiving element such as PD (photodiode) and the IC chip constitutes an amplifier circuit for amplifying an electrical signal from the light-receiving element. The photoelectric conversion array element is a surface emitting type or a surface receiving type and is arranged so that a light outputting or inputting surface thereof faces a surface of the FPC board.

The optical waveguide member 208 is integrally provided at an end portion of one surface of the FPC board on a side where the "optical waveguide member 208" is fixed. Plural grooves corresponding to the number of the optical fibers are formed in a stripe pattern at an end portion of the optical waveguide member 208, and each groove accommodates the front end portion of the optical fiber.

Figure 6:
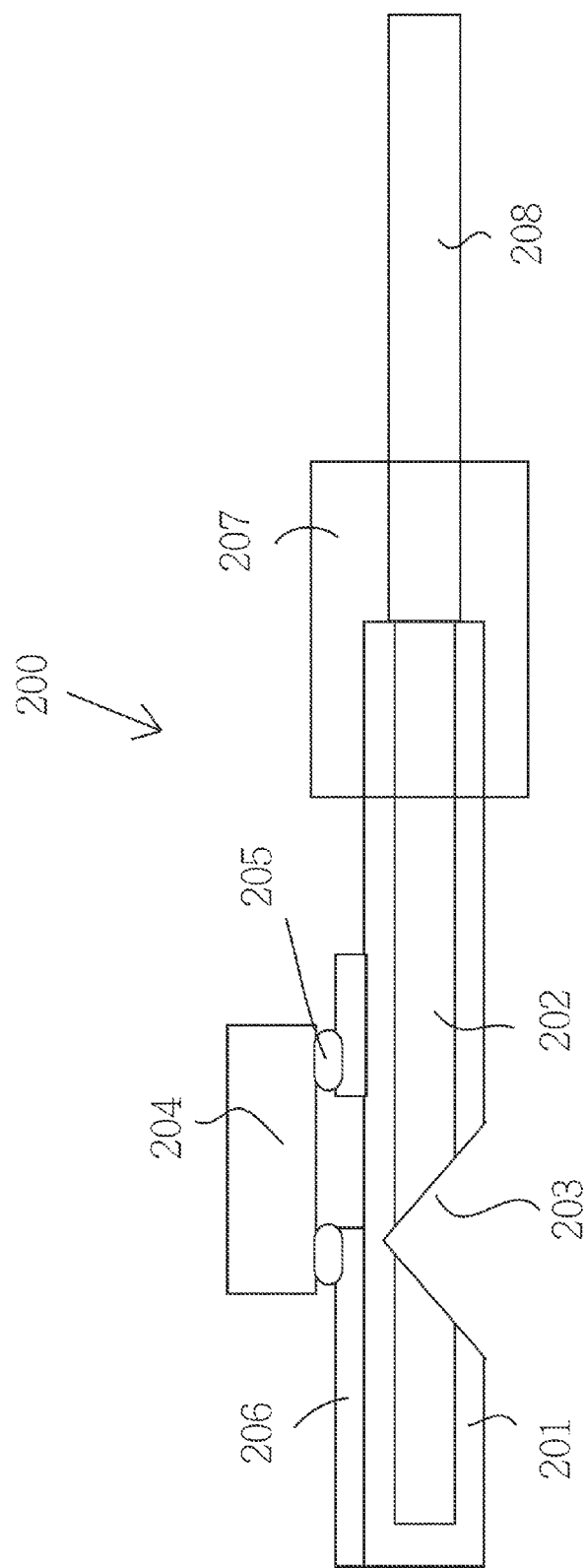
FIG. 6 illustrates a schematic partial cross sectional view showing a flexible substrate and its connection components of photoelectric conversion module according to one embodiment of the invention.

FIG. 6 illustrates a schematic partial cross sectional view showing a flexible substrate and its connection components of photoelectric conversion module according to one embodiment of the invention. The photoelectric conversion module may be made by employing a standard semiconductor manufacturing process. In this embodiment, the photoelectric conversion module 200 comprises a flexible substrate (waveguide), an optical waveguide member 208, optical element 204, and an optical connector/carrier 207. In this embodiment, the optical element 204 is, for example a light source chip, a photo diode chip or a photo detector chip, configured on the flexible substrate. In another embodiment, ICs are, for example a driver integrated circuit (IC), a control IC or a trans-impedance amplifier (TIA) chip, or others active components, configured on the flexible substrate. That is, the light source chip, the photo diode chip, the photo detector, the driver integrated circuit (IC), the control IC or the trans-impedance amplifier (TIA) chip are configured/integrated onto upper side of the flexible substrate (such as FPC board). The driver IC may be used to drive the light source chip (such as optoelectronic device) for emitting light. In this embodiment, the flexible substrate has waveguide function used for guiding light. The flexible substrate comprises an optical waveguide portion composed of a clad 201 and a core 202, wherein the core 202 is made of a flexible material, such as polymer. The clad 201 is covering over the core 202. The optical waveguide portion is used as an optical waveguide which has a concave structure, such as V-shape trench, with an optical micro-reflection surface 203 at one side of (within) V-shape trench of the flexible waveguide. Vertical thickness of the V-shape trench is larger than that of the core 202, and the V-shape trench is passing through the core 202. V-shape trench may be formed by an imprinting process, a wedge cutting process or a laser cutting process.

The flexible substrate, the optical waveguide member 208 and the optical connector/carrier 207 are three independent components, wherein the flexible substrate and the optical waveguide member 208 are aligned and packaged by the optical connector/carrier 207.

In this embodiment, electrical layer locates upper side of the flexible substrate and optical layer locates lower side of the flexible substrate. The one end of the flexible substrate is engaged with (disposed on) the carrier/optical connector 207 for the optical layer (optical waveguide portion) capable of light signal communicating with the external optical signal via optical fiber or optical waveguide member 208. The flexible substrate (FPC board) is connected to the optical fiber or optical waveguide member 208. The core of the optical waveguide portion of the flexible substrate (FPC board) is aligned to the optical fiber or optical waveguide member 208. The electrical layer includes metal trace 206, active electronic components and passive electronic components. The active electronic components is for example light source chip, photo detector (diode) chip, driver integrated circuit (IC), control IC or trans-impedance amplifier (TIA) chip, or others active components. The passive electronic components include resistance, capacitance, inductance, or others passive components for the active electronic components normally operating. The active electronic components and the passive electronic components may be packaged on the flexible substrate (such as FPC board). The optical layer includes the optical reflector/mirror 203 and the optical waveguide portion of the flexible substrate composed of clad 201 and core 202 which are integrated into the FPC board. The optical waveguide member 208 is connected to other (external) optical component by the carrier/optical connector 207 for optical coupling or optical connecting. The carrier/optical connector 207 may be one-piece component or plural-pieces component, and for single optical channel or multiple optical channels.

The flexible printed circuit (FPC) board combines with flexible waveguide (optical waveguide portion) for optical communication. Such structure may receive and transmit optical signal through the flexible waveguide. Light created by the light source may be reflected via the optical micro-reflection surface 203 at one side of the flexible substrate (waveguide).

The flexible waveguide is allowable for optical path therein, for facilitating light emitted from the light source 204 or coming from external passing through therein. The light source 204 is capable of emitting visible and invisible light. The light source 204 is for example a laser, infrared light or a light emitting diode (LED). Infrared light is in infrared band, which can be emitted by laser or LED.

The optical micro-reflection surface 203 has a specified angle (such as 45 degree angle or other degree angle). V trench of the flexible substrate (waveguide) has in a specified depth. The first end of the V bench of the flexible waveguide forms a reflection surface. The V bench has a first slant plane and a second slant plane 203. In one embodiment, the first slant plane is opposite to the second slant plane 203.

For example, the light source or photo detector is arranged in the vicinity of one side of the optical micro-reflection surface 203. Therefore, optical signal emitted by the light source 204 is reflected by the optical micro-reflection surface 203 of the V trench and then passing through the flexible waveguide.

Material and thickness of the flexible substrate (waveguide) may be selected, based-on requirements for practical applications. For example, material of the flexible waveguide includes polymer material, dielectric material. In one embodiment, the flexible substrate may be a flexible material, including polymer material, such as polyimide.

As noted above, the flexible waveguide (optical waveguide portion) of the flexible substrate includes an under cladding layer, a core and an over cladding layer. Materials of the under cladding layer, the core and the over cladding layer are not specifically limited, and it is possible to used, e.g., an acrylic resin, an epoxy resin and a polyimide resin, etc.

The optical micro-reflection surface 203 is arranged on an optical path extending between the light source (photoelectric conversion array element) 204 and the core to bend the optical path 90 degree. In other words, the optical path penetrates the FPC board.

Figure 7A:
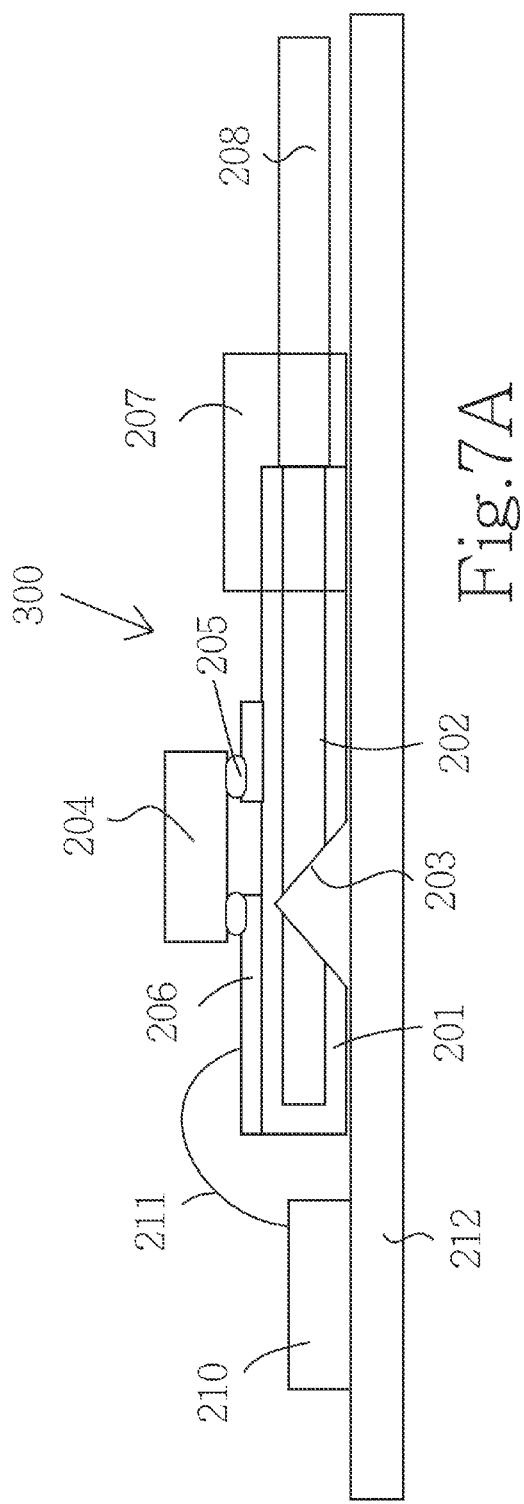
FIG. 7A illustrates a photoelectric conversion module according to one embodiment of the invention.
Figure 7B:
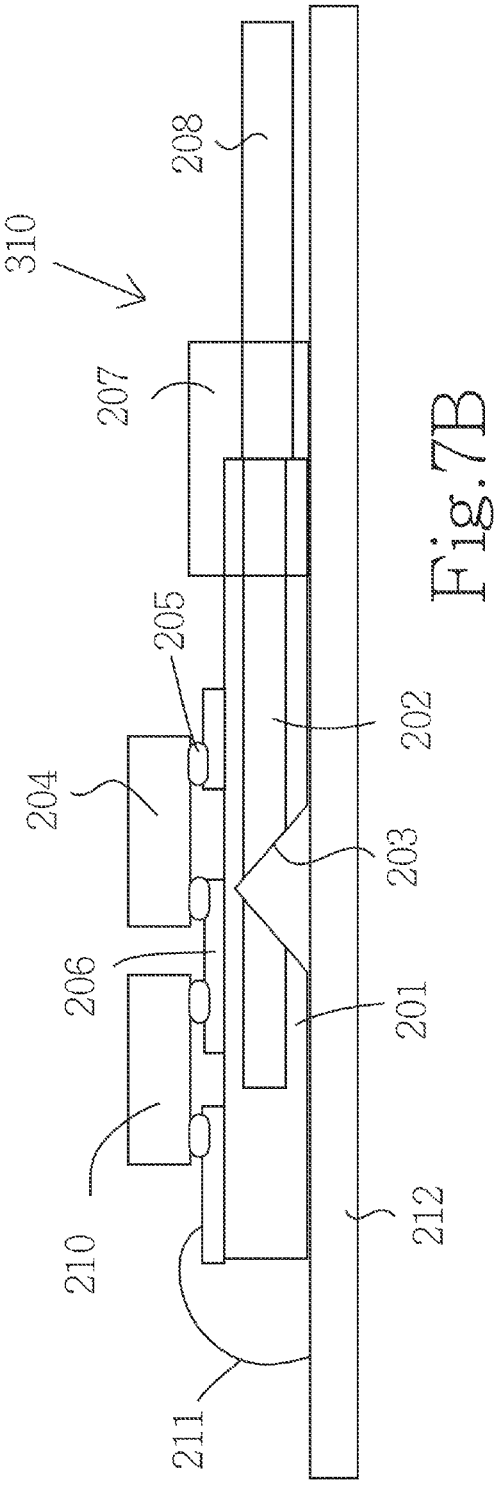
FIG. 7B illustrates a photoelectric conversion module according to another embodiment of the invention.

In general, the light source chip or the photo detector (diode) chip 204 is packaged on the flexible substrate, and other ICs 210 and passive electronic components may be packaged on the flexible substrate shown in FIG. 7B which depicts a photoelectric conversion module 310, or directly packaged on the circuit board 212 shown in FIG. 7A which depicts a photoelectric conversion module 300. The light source chip, the photo detector (diode) chip 204 are electrically connected to ICs 210 by wire 211 coupling to the conductive trace 206 on the flexible substrate and conductive trace on the circuit board 212, shown in FIG. 7A. The conductive trace 206 on the flexible substrate is coupled to conductive bump 205 (for example solder bump, metal bump or gold bump) under the light source chip, the photo detector (diode) chip 204. ICs 210 are electrically connected to the external apparatus or equipment for signal connection via the conductive trace of the circuit board 212. V-shape trench is facing the circuit board 212.

In another example, the light source chip, the photo detector (diode) chip 204 and ICs 210 are packaged on the flexible substrate by flip-chip mounting process, and the conductive trace 206 on the flexible substrate is electrically connected to conductive trace on the circuit board 212 by wire 211 bonding, shown in FIG. 7B. That is, IC chip 210 and the light source chip, the photo detector (diode) chip 204 are flip-chip-mounted at a predetermined position on surface of the flexible substrate (FPC board). The light source chip, the photo detector (diode) chip 204 is coupled to ICs 210 via conductive bump 205 under the light source chip, the photo detector (diode) chip 204 and the conductive trace 206 on the flexible substrate. ICs 210 are electrically connected to the external apparatus or equipment for signal connection via the conductive trace of the circuit board 212.

Figure 8:
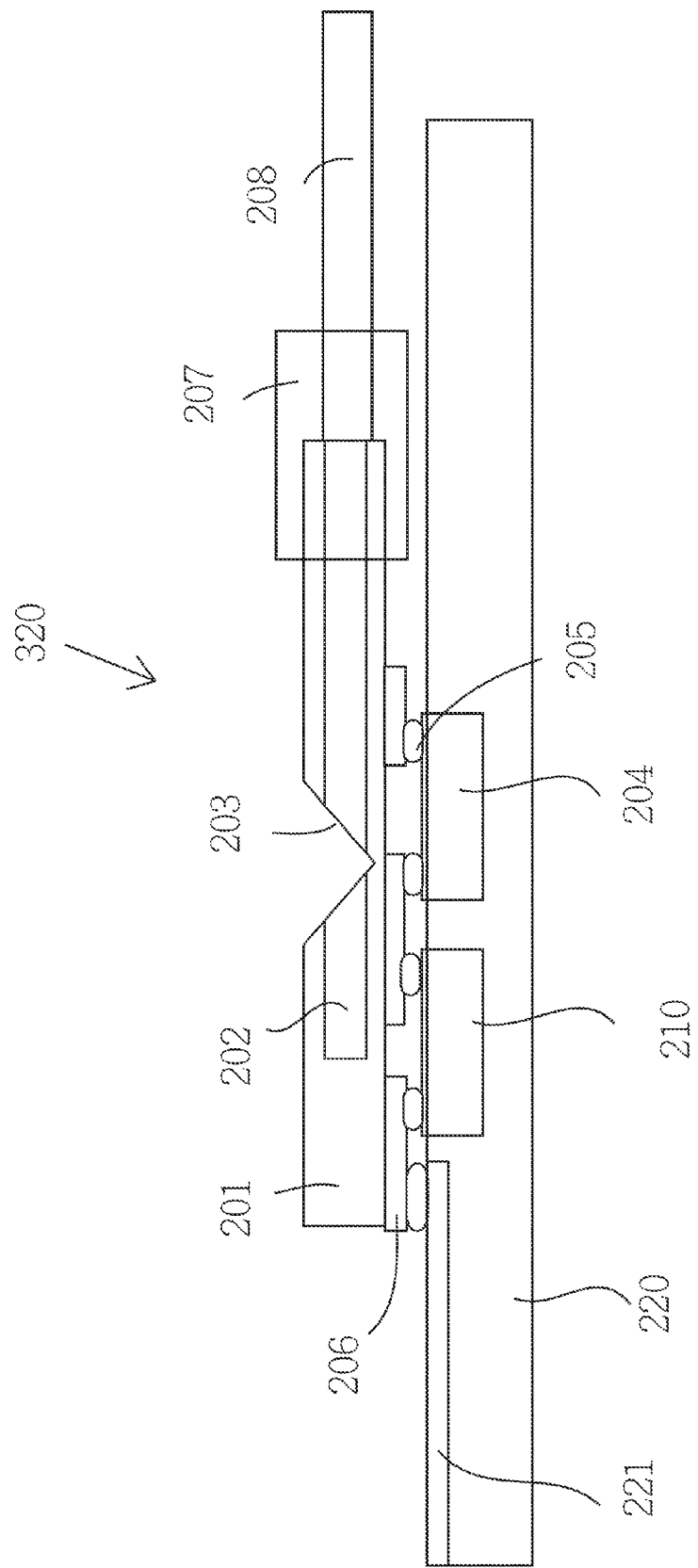
FIG. 8 illustrates a photoelectric conversion module according to yet another embodiment of the invention.

In yet another example, the light source chip, the photo detector (diode) chip 204 and ICs 210 are packaged on the flexible substrate by flip-board process, and the conductive trace 206 under the flexible substrate is electrically connected to the conductive trace on circuit board 220 via conductive bump 205, shown in FIG. 8 which depicts a photoelectric conversion module 320. V-shape trench is facing opposite side of the circuit board 220. The light source chip, the photo detector (diode) chip 204 is coupled to ICs 210 via the conductive bump 205 on the light source chip, the photo detector (diode) chip 204 and ICs 210 and the conductive trace 206 under the flexible substrate. ICs 210 are electrically connected to the external apparatus or equipment for signal connection via the conductive bump 205, the conductive trace 206 and the conductive trace 221 of the circuit board 220. In this embodiment, flexible photoelectric conversion module is directly electrically connected to the circuit board 220 by flip-board for signal connection. The circuit board 220 has plural cavities or holes for aligning and receiving the light source chip, the photo detector (diode) chip 204 and ICs 210 of the flexible photoelectric conversion module. That is, light source chip, photo detector (diode) chip 204 and ICs 210 are packaged into the circuit board 220 by flip-board.

The conductive trace of the flexible substrate (FPC board) may be electrically connected to ICs or the circuit board by wire bond or flip board for signal connection.

As will be understood by persons skilled in the art, the foregoing preferred embodiment of the present invention illustrates the present invention rather than limiting the present invention. Having described the invention in connection with a preferred embodiment, modifications will be suggested to those skilled in the art. Thus, the invention is not to be limited to this embodiment, but rather the invention is intended to cover various modifications and similar arrangements included within the spirit and scope of the appended claims, the scope of which should be accorded the broadest interpretation, thereby encompassing all such modifications and similar structures. While the preferred embodiment of the invention has been illustrated and described, it will be appreciated that various changes can be made without departing from the spirit and scope of the invention.

What is claimed is:

1. A photoelectric conversion module, comprising:
   a circuit board;
   a flexible substrate configured on said circuit board, with a concave structure having a first optical micro-reflection surface and a second optical micro-reflection surface formed opposite to said first optical micro-reflection surface;
   an optical component configured on said flexible substrate;
   an IC chip mounted on said circuit board and electrically connected to said optical component via a wire and a conductive trace on said flexible substrate; and
   an optical waveguide member connected to said flexible substrate;
   wherein said flexible substrate and said optical waveguide member are packaged by a carrier or an optical connector.

2. The photoelectric conversion module of claim 1, wherein said flexible substrate is FPC board.

3. The photoelectric conversion module of claim 1, wherein said flexible substrate has an optical waveguide portion composed of a clad and a core.

4. The photoelectric conversion module of claim 3, wherein said concave structure is V-shape trench, wherein vertical thickness of said V-shape trench is larger than that of said core, and said V-shape trench is passing through said core.

5. The photoelectric conversion module of claim 1, wherein said circuit board includes plural electrode terminals arranged at an end portion of said circuit board.

6. The photoelectric conversion module of claim 1, further comprising a housing composed of a first case and a second case, wherein said circuit board is fixed to said second case.

7. The photoelectric conversion module of claim 6, further comprising a plug configured at one end of said housing.

8. A photoelectric conversion module, comprising:
   a circuit board;
   a flexible substrate configured on said circuit board, with a concave structure having a first optical micro-reflection surface and a second optical micro-reflection surface formed opposite to said first optical micro-reflection surface;
   an optical component configured on said flexible substrate;
   an IC chip mounted on said flexible substrate and electrically connected to said optical component via a conductive trace on said flexible substrate; and
   an optical waveguide member connected to said flexible substrate;
   wherein said flexible substrate and said optical waveguide member are packaged by a carrier or an optical connector.

9. The photoelectric conversion module of claim 8, wherein said flexible substrate is FPC board.

10. The photoelectric conversion module of claim 8, wherein said flexible substrate has an optical waveguide portion composed of a clad and a core.

11. The photoelectric conversion module of claim 10, wherein said concave structure is V-shape trench, wherein vertical thickness of said V-shape trench is larger than that of said core, and said V-shape trench is passing through said core.

12. The photoelectric conversion module of claim 8, wherein said circuit board includes plural electrode terminals arranged at an end portion of said circuit board.

13. The photoelectric conversion module of claim 8, further comprising a housing composed of a first case and a second case, wherein said circuit board is fixed to said second case.

14. The photoelectric conversion module of claim 13, further comprising a plug configured at one end of said housing.

15. A photoelectric conversion module, comprising:
a circuit board with plural cavities or holes;
an optical component configured on one of said plural cavities or holes;
an IC chip configured on another of said plural cavities or holes; and
a flexible substrate configured on said circuit board, with a concave structure having a first optical micro-reflection surface and a second optical micro-reflection surface formed opposite to said first optical micro-reflection surface;
wherein said IC chip is electrically connected to said optical component via a conductive trace on said flexible substrate;
an optical waveguide member connected to said flexible substrate;
wherein said flexible substrate and said optical waveguide member are packaged by a carrier or an optical connector.

16. The photoelectric conversion module of claim 15, wherein said flexible substrate is FPC board.

17. The photoelectric conversion module of claim 15, wherein said flexible substrate has an optical waveguide portion composed of a clad and a core.

18. The photoelectric conversion module of claim 17, wherein said concave structure is V-shape trench, wherein vertical thickness of said V-shape trench is larger than that of said core, and said V-shape trench is passing through said core.

19. The photoelectric conversion module of claim 15, wherein said circuit board includes plural electrode terminals arranged at an end portion of said circuit board.

20. The photoelectric conversion module of claim 15, further comprising a housing composed of a first case and a second case, wherein said circuit board is fixed to said second case, and a plug configured at one end of said housing.

* * * * *